United States Patent
Tian et al.

(10) Patent No.: US 10,908,952 B2
(45) Date of Patent: Feb. 2, 2021

(54) PREEMPTIVE SCHEDULING OF IN-ENCLAVE THREADS

(71) Applicant: INTEL CORPORATION, Santa Clara, CA (US)

(72) Inventors: Hongliang Tian, Beijing (CN); Shoumeng Yan, Beijing (CN); Mona Vij, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/474,905

(22) PCT Filed: Apr. 21, 2017

(86) PCT No.: PCT/CN2017/081436
§ 371 (c)(1),
(2) Date: Jun. 28, 2019

(87) PCT Pub. No.: WO2018/191955
PCT Pub. Date: Oct. 25, 2018

(65) Prior Publication Data
US 2019/0332427 A1    Oct. 31, 2019

(51) Int. Cl.
*G06F 9/48* (2006.01)
*G06F 21/71* (2013.01)
*G06F 9/32* (2018.01)
*G06F 9/38* (2018.01)

(52) U.S. Cl.
CPC .......... *G06F 9/4881* (2013.01); *G06F 9/327* (2013.01); *G06F 9/3836* (2013.01); *G06F 9/485* (2013.01); *G06F 21/71* (2013.01)

(58) Field of Classification Search
CPC ......... G06F 21/71; G06F 9/4881; G06F 9/485
See application file for complete search history.

(56) References Cited

U.S. PATENT DOCUMENTS

| 9,087,202 B2 | 7/2015 | Kang |
| 2011/0212761 A1* | 9/2011 | Paulsen ............... G07F 17/3223 463/25 |
| 2014/0337983 A1 | 11/2014 | Kang et al. |

(Continued)

FOREIGN PATENT DOCUMENTS

CN    1490722 A    4/2004

OTHER PUBLICATIONS

Arnautov, Sergei, et al. "SCONE: Secure linux containers with Intel SGX." 12th USENIX Symp. Operating Systems Design and Implementation. 2016, 17pgs.

(Continued)

*Primary Examiner* — Zachary K Huson
(74) *Attorney, Agent, or Firm* — Finch & Maloney PLLC

(57) ABSTRACT

Preemptive scheduling enclaves as disclosed herein support both cooperative and preemptive scheduling of in-enclave (IE) thread execution. These preemptive scheduling enclaves may include a scheduler configured to be executed as part of normal hardware interrupt processing by enclave threads. The scheduler identifies an IE thread to be scheduled and modifies enclave data structures so that when the enclave thread resumes processing after a hardware interrupt, the identified IE thread is executed, rather than the interrupted IE thread.

20 Claims, 6 Drawing Sheets

(56) References Cited

U.S. PATENT DOCUMENTS

2015/0186297 A1 7/2015 Lashley et al.
2015/0378941 A1* 12/2015 Rozas .................... G06F 21/00
            710/267

OTHER PUBLICATIONS

Anderson, Thomas E., et al. "Scheduler activations: Effective kernel support for the user-level management of parallelism." ACM Transactions on Computer Systems (TOCS) 10.1 (1992): 53-79, 27 pgs.
Soares, Livio, and Michael Stumm. "FlexSC: Flexible system call scheduling with exception-less system calls." Proceedings of the 9th USENIX conference on Operating systems design and implementation. USENIX Association, 2010, 14 pgs.
Intel SGX SDK for Linux. <https://github.com/01org/linux-sgx>, downloaded from the Internet Jan. 14, 2020, 8 pgs.
Baumann, Andrew, Marcus Peinado, and Galen Hunt. "Shielding applications from an untrusted cloud with haven." ACM Transactions on Computer Systems (TOCS) 33.3 (2015): 8, 19 pgs.
Graphene-SGX. <https://github.com/oscarlab/graphene> downloaded from Internet Jan. 14, 2020, 6 pgs.
Intel Software Guard Extensions Programing Reference, Oct. 2014, 186 pgs.
International Preliminary Report on Patentability received for PCT/CN2017/081436, dated Jul. 18, 2019, 5 pages.
International Search Report and Written Opinion for PCT/CN2017/081436, dated Sep. 18, 2017.

* cited by examiner

PREEMPTIVE SCHEDULING OF IN-ENCLAVE THREADS

BACKGROUND

Secure enclaves are regions of protected memory where confidentiality and integrity of data and code are guaranteed. Only logical processors that are executing within a secure enclave can access the code and data stored therein. Secure enclaves enable trusted computation on untrusted platforms, such as public clouds. This feature of secure enclaves is highly desirable for a wide range of security-critical applications, such as bank transactions, medical record management, and the like. Examples of instruction set architectural extensions that enable applications to utilize secure enclaves include Software Guard Extensions (SGX) implemented by Intel Corporation of Santa Clara, Calif.

DETAILED DESCRIPTION

Figure 1:
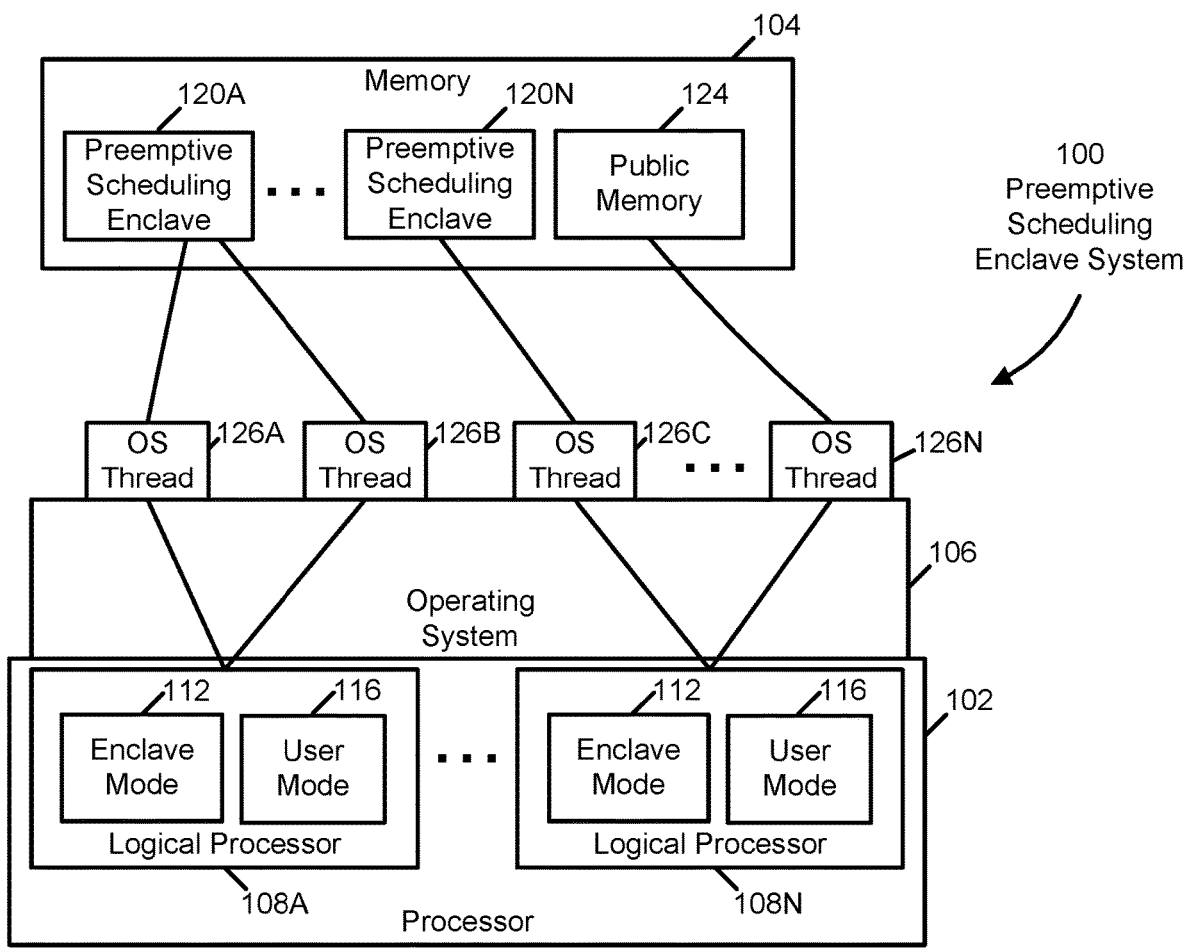
FIG. 1 is a block diagram illustrating a system including preemptive scheduling enclaves configured in accordance with an embodiment of the present disclosure.

Preemptive scheduling enclaves as disclosed herein are enclaves that support both cooperative and preemptive scheduling of in-enclave (IE) thread execution. IE threads are user-level threads that are executed inside a preemptive scheduling enclave. In some embodiments, the IE threads are executed by enclave threads. Enclave threads are kernel-level threads executed inside the preemptive scheduling enclave by a logical processor. In some embodiments, each preemptive scheduling enclave includes a scheduler that is also executed by the logical processor to periodically reschedule IE threads. The logical processor may be a single core processor or a single core of a multi-core processor.

In some embodiments, the logical processor executes the scheduler in response to execution of a cooperative scheduling function by an IE thread. In these embodiments, the logical processor also executes the scheduler as part of the logical processor's handling of a hardware interrupt. As is described further below, some embodiments cleverly leverage the enclave thread's default behavior in administration of the preemptive scheduling enclave to initiate the scheduler at a point where preemptive scheduling can be resourcefully implemented.

For instance, in some embodiments where an exclave exit event (e.g., a hardware interrupt) occurs during execution of an IE thread, the enclave thread executes, as part of its default enclave administrative behavior, an asynchronous enclave exit (AEX). In executing an AEX, the enclave thread saves a current state of the logical processor at a predefined location within the preemptive scheduling enclave. This predefined location is referred to herein as a current state save area (SSA). The current SSA may be one of many SSA's within the preemptive scheduling enclave. Each of these SSA's is allocated to store information sufficient to enable the logical processor to restore itself to a previous state from which execution of an interrupted IE thread can be continued. In this way, the logical processor can store all of the information needed to seamlessly handle hardware interrupts with respect to the interrupted IE thread. Each SSA may store a variety of information including general purpose register values, special purpose values, and feature specific register values.

In executing the AEX, the enclave thread also transfers control, after the operating system handles the hardware interrupt, to a pre-specified instruction address outside the preemptive scheduling enclave. This address is indicated by an asynchronous exit handler pointer (AEP). Conventionally, the instructions at an AEP simply resume execution of the interrupted IE thread (i.e., the IE thread associated within the logical processor state information stored in the current SSA). However, some embodiments disclosed herein store the instructions of a preemption manager at the AEP. In these embodiments, the preemption manager is configured to determine whether preemption of the interrupted IE thread is warranted and, if preemption is warranted, re-enter (rather than resume) the preemptive scheduling enclave to initiate the scheduler. This re-entry of the enclave by the preemption manager is referred to herein as a nested entry. In a nested entry, the logical processor executes the scheduler via either an IE thread or an enclave thread that is distinct from any interrupted enclave or IE threads.

Further, in these embodiments, the preemption manager is configured to simply resume execution of the interrupted IE thread where preemption is not warranted. In some embodiments, the preemption manager determines whether preemption is warranted by determining whether processor time allocated for the interrupted IE thread is exhausted.

In some embodiments, the scheduler is configured to identify the next IE thread to be executed and to cause the logical processor to switch from execution of a current IE thread to execution of the next IE thread. In executing according to this configuration, the scheduler identifies the next IE thread to be executed using a scheduling process. The particular type of scheduling process (e.g., round-robin, multilevel queue, first-come first-serve, etc.) executed by the scheduler may vary between embodiments, and thus the embodiments disclosed herein are not limited to a particular scheduling process. After identifying the next IE thread, the scheduler modifies enclave data structures to replace the current IE thread with the next IE thread and executes a context switching process that varies depending on whether the scheduler was initiated by a cooperative scheduling function or by the preemption manager. Where the scheduler is initiated by a cooperative scheduling function, the scheduler switches the state of the logical processor from a state associated with the current IE thread to a state associated with the next IE thread and executes the next IE thread. Where the scheduler is initiated by the preemption manager via a nested entry, the scheduler switches the logical processor state stored in the current SSA with the logical processor state associated with the next IE thread and exits the enclave. When the preemption manager resumes execution of the interrupted enclave thread, the interrupted enclave thread actually executes the next IE thread because the current IE thread was replaced by the next IE thread and the state associated with the next IE thread is stored in the current SSA. By leveraging the existing infrastructure of enclave administration, the embodiments disclosed herein implement preemptive scheduling without requiring modifications to the operating system or additional computing hardware.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

To maximize logical processor utilization of enclave-protected applications on multi-core processors, multiple operating system (OS) threads are allowed to execute multiple enclave threads within the same enclave. However, some operations on enclave threads, such as creation, destruction, scheduling, and synchronization, are expensive because they require a logical processor to transition between user mode and enclave mode. These transitions require substantial processor time to complete due to complicated bookkeeping and security checks, saving and restoring of logical processor states, and translation lookaside buffer (TLB) misses caused by flushed TLBs.

To address these issues, previous work has focused on user-level, cooperative multithreading mechanisms inside the enclave, thus eliminating the need for enclave transitions when switching threads. Unfortunately, conventional IE multithreading support suffers from a serious limitation—lack of support for preemptive scheduling. Preemptive scheduling avoids starvation among threads, improves program responsiveness, and frees programmers from crafting application-specific scheduling logic. For these reasons, preemptive scheduling is generally considered to be superior to cooperative scheduling, and most modern OSs support preemptive scheduling for OS threads.

Thus, and in accordance with at least some embodiments disclosed herein, a preemptive scheduling enclave is provided in which IE threads may be cooperatively or preemptively scheduled. In one embodiment, the preemptive scheduling enclave includes a scheduler configured to reschedule IE threads. The scheduler is also configured to implement the schedules differently, based on whether the scheduler is initiated by a cooperative function call from an IE thread or by a preemption manager located outside the preemptive scheduling enclave. The overall solution resourcefully utilizes default enclave thread actions taken in administration of the preemptive scheduling enclave to implement preemptive scheduling of IE threads in an elegant manner.

System Architecture

FIG. 1 illustrates a preemptive scheduling enclave system 100 implemented by a computing device that includes a processor 102 coupled to a memory 104. As shown in FIG. 1, the processor 102 includes logical processors 108A through 108N and the memory includes preemptive scheduling enclaves 120A through 120N and public memory 124. Unlike the memory of the preemptive scheduling enclaves 120A through 120N, the public memory 124 may be accessed by any of the logical processors 108A through 108N without the logical processors entering enclave mode 112, as is discussed further below. The memory 104 may incorporate volatile and/or non-volatile data storage (e.g., read-only memory, random access memory, flash memory, magnetic/optical disk, and/or some other computer readable and writable medium) that is readable and/or writable by the processor 102. The memory 104 is sized and configured to store programs to be executed by the processor 102 and at least some of the data used by the programs during execution.

As shown in FIG. 1, the processor 102 is a multi-core processor that includes the logical processors 108A through 108N. Each of the logical processors 108A through 108N includes various computing circuitry, such as an arithmetic-logic unit and register memory, that can execute instructions defined by an instruction set supported by the logical processor. In some embodiments, each of the logical processors 108A through 108N can execute instructions in an enclave mode 112 and a user mode 116. When executing in enclave mode 112, a logical processor allows software applications to execute a set of instructions that manipulate enclaves. According to at least one embodiment, these additional instructions are described in the Intel® Software Guard Extensions Programming Reference, published October 2014 by Intel Corporation of Santa Clara, Calif. Examples of these instructions in this embodiment include ECREATE, EINIT, and EADD to create, initialize, and add pages to an enclave. Other examples of these instructions include EENTER, ERESUME, and EEXTT to enter, resume, and exit an enclave.

As shown in FIG. 1, the processor 102 implements an operating system 106 and OS threads 126A through 126N.

The operating system 106 supports execution of each of the OS threads 126A through 126N. In some embodiments, each of the OS threads 126A and 126N is executed by one of the logical processors 108A through 108N. Each of the logical processors 108A through 108N may execute a single, corresponding OS thread of the OS threads 126A through 126N, although the embodiments disclosed herein are not limited in this regard. As shown in FIG. 1, each of the OS threads 126A through 126N can access and manipulate executable code and data stored in each of the preemptive scheduling enclaves 120A through 120N and the public memory 124.

To access code and/or data stored within one of the preemptive scheduling enclaves 120A through 120N, each of the OS threads 126A through 126N includes an instruction (e.g., EENTER) to enter one of the preemptive scheduling enclaves 120A through 120N. Such an instruction causes a logical processor executing it (i.e., one of the logical processors 108A through 108N) to enter the enclave mode 112. The logical processor's entry into the enclave mode 112 extends an OS thread being executed by the logical processor into an enclave thread. An enclave thread may execute instructions to access and manipulate code and data stored in a preemptive scheduling enclave. Once a logical processor has entered a preemptive scheduling enclave and established an enclave thread, to execute any code outside the preemptive scheduling enclave, the logical processor must execute (via the enclave thread) an instruction (e.g., EEXIT) that causes the logical processor to exit enclave mode 112 and enter user mode 116 or some other processor operating mode.

Although FIG. 1 depicts logical processors 108A through 108N, OS threads 126A through 126N, and preemptive scheduling enclaves 120A through 120N, the embodiments disclosed herein are not limited to any particular numbers for these components. Nor are these components required to be provided in like numbers. Rather, in the embodiments disclosed herein, each of these components may be provided in the singular or an any other number without departing from the scope of this disclosure.

Figure 2:
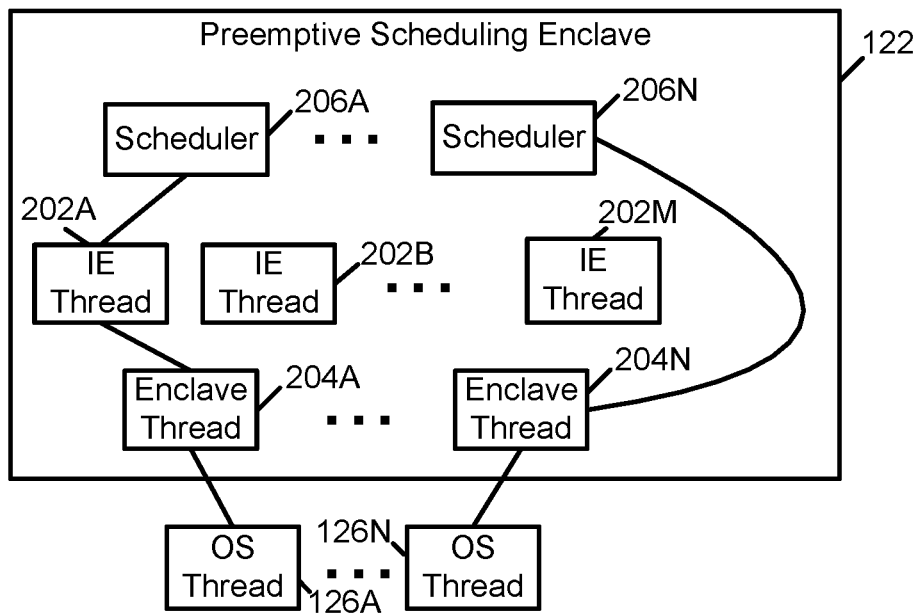
FIG. 2 is a block diagram illustrating one of the preemptive scheduling enclaves of the system of FIG. 1 in accordance with an embodiment of the present disclosure.

FIG. 2 illustrates the preemptive scheduling enclave 122 in greater detail. As shown in FIG. 2, the preemptive scheduling enclave 122 includes schedulers 206A through 206N, enclave threads 204A through 204M, and in-enclave (IE) threads 202A through 202M.

In some embodiments illustrated by FIG. 2, each of the OS threads 126A through 126N can enter the preemptive scheduling enclave 122. When entering the preemptive scheduling enclave 122, each of the OS threads supplies a corresponding thread control structure (TCS) for an enclave thread. In some embodiments, each of the TCSs includes information descriptive of a corresponding enclave thread (e.g., fields used to calculate an address of thread local storage (TLS), among other information). In entering an enclave, each of the OS threads establishes a corresponding enclave thread (e.g., one of the enclave threads 204A through 204N). Each of these enclave threads may execute one or more IE threads (e.g., one or more of the IE threads 202A through 202M).

During execution, each of the IE threads 202A through 202M securely and confidentially manipulates data stored within the preemptive scheduling enclave 122. While executing one or more of these IE threads, a logical processor may encounter a hardware interrupt. According to some embodiments, when a hardware interrupt is encountered, the active enclave thread saves the state of the logical processor in an SSA (which is associated with and identifies the interrupted IE thread) and exits the preemptive scheduling enclave. Further, in some embodiments, after handling the interrupt, the logical processor executes one or more instructions at a location external to the preemptive scheduling enclave, rather than simply resuming the interrupted IE thread.

Figure 3:
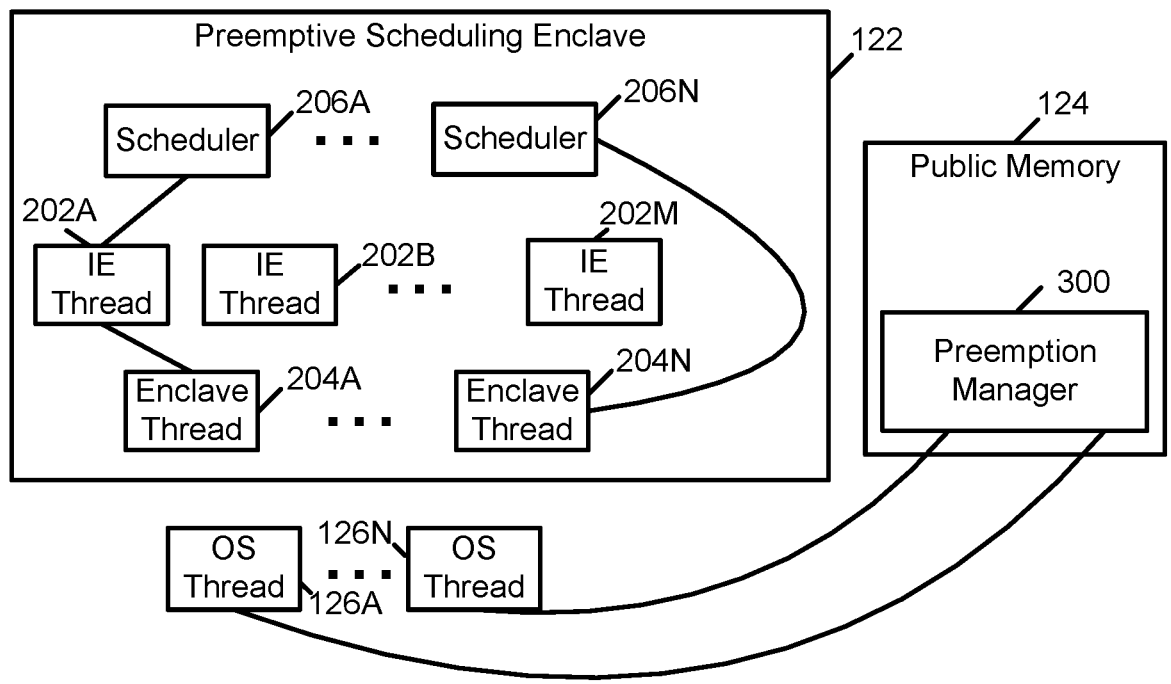
FIG. 3 is a block diagram illustrating one of the preemptive scheduling enclaves and the public memory of the system of FIG. 1 in accordance with an embodiment of the present disclosure.

FIG. 3 illustrates the action of executing these external instructions as embodied in a preemption manager 300. In some embodiments, the preemption manager 300 is configured to determine whether the interrupted IE thread should resume execution or be preempted by another IE thread. Where appropriate, the preemption manager 300 initiates preemptive rescheduling. Acts executed by the preemption manager 300 to accomplish this objective is described further below with reference to FIG. 4.

As shown in FIG. 2, an IE thread (e.g., the IE thread 202A) may execute a scheduler (e.g. the scheduler 206A) to implement cooperative scheduling. Alternatively or additionally, an enclave thread (e.g., the enclave thread 204N) may execute a scheduler (e.g., the scheduler 206N) to implement preemptive scheduling. Regardless, each of the schedulers 206A through 206N is configured to identify and schedule IE threads using either cooperative or preemptive scheduling techniques. Examples of processes executed by each of the schedulers 206A through 206N to accomplish these objectives are described further below with reference to FIGS. 4, 5, 6 and 7.

The schedulers 206A through 206N and the preemption manager 300 may be implemented in a variety of hardware and software. For example, schedulers 206A through 206N and/or the preemption manager 300 may be provided as a set of instructions executable by a logical processor within a library operating system or within a dynamic or statically linkable library.

Although FIG. 2 depicts schedulers 206A through 206N, enclave threads 204A through 204M, and IE threads 202A through 202M, the embodiments disclosed herein are not limited to any particular numbers for these components. Nor are these components required to be provided in like numbers. Rather, in the embodiments disclosed herein, each of these components may be provided in the singular or an any other number without departing from the scope of this disclosure. For example, in some embodiments, the enclave threads may implement 1-on-1, N-on-1, or N-on-M threading models relative to the IE threads.

Figure 4:
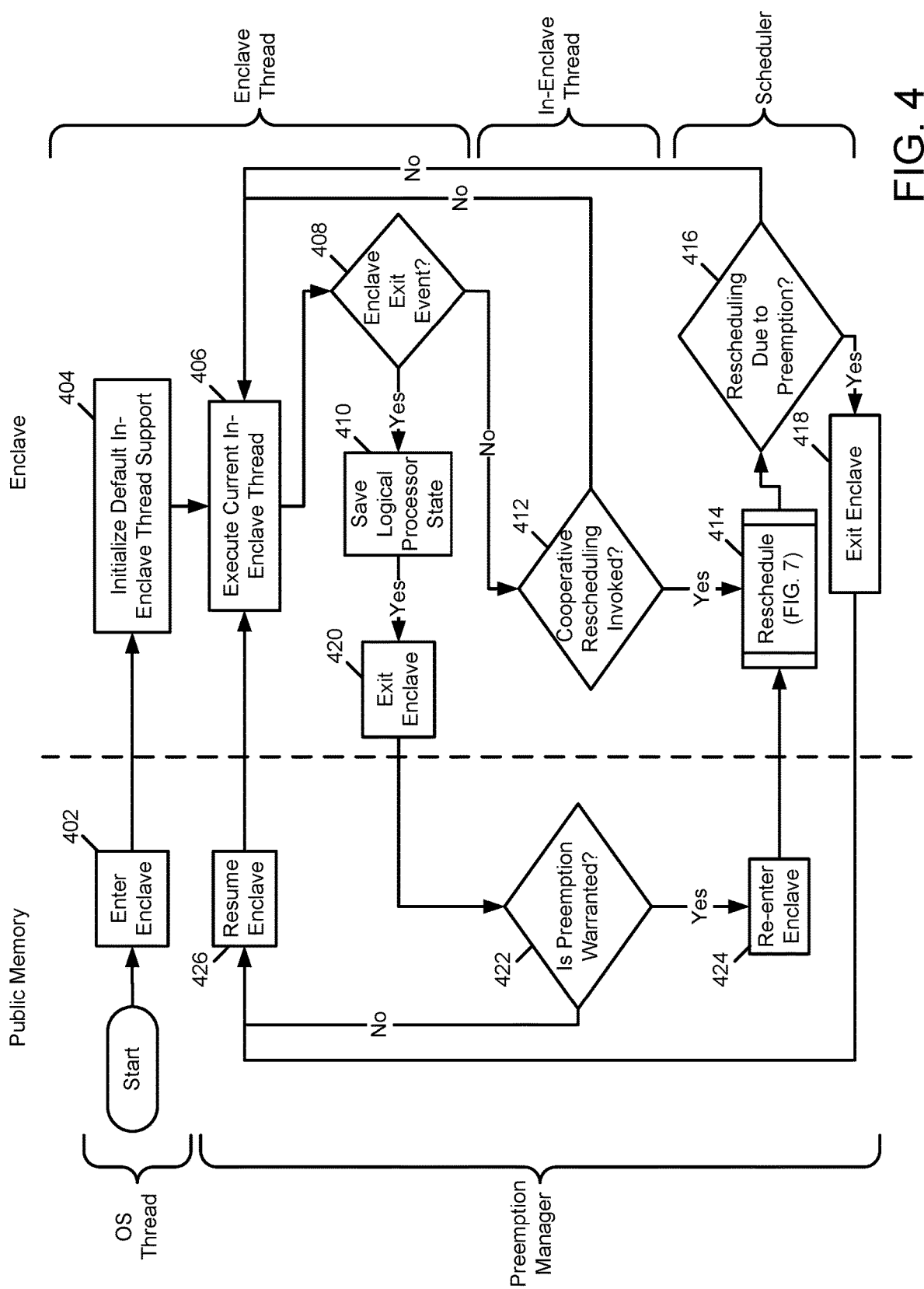
FIG. 4 is a flow chart illustrating a preemptive scheduling process in accordance with an embodiment of the present disclosure.

FIG. 4 illustrates a scheduling process 400 in accordance with some embodiments. In these embodiments, the scheduling process 400 is executed by a logical processor, such as one of the logical processors 108A through 108N described above with reference to FIG. 1. As shown in FIG. 4, the scheduling process 400 includes several acts that collectively enable a computing device to schedule IE threads (e.g., the IE threads 202A through 202M) cooperatively and/or preemptively.

The scheduling process 400 starts in act 402 with the logical processor entering, via an OS thread, a preemptive scheduling enclave. In at least one embodiment, this entry is accomplished by execution of an EENTER command that specifies a TCS (e.g., the TCS 504 described further below with reference to FIG. 5) of an enclave thread to be executed. The OS thread may be any one of the OS threads 126A through 126N. The preemptive scheduling enclave may be any one of the preemptive scheduling enclaves 120A through 120N.

Figure 5:
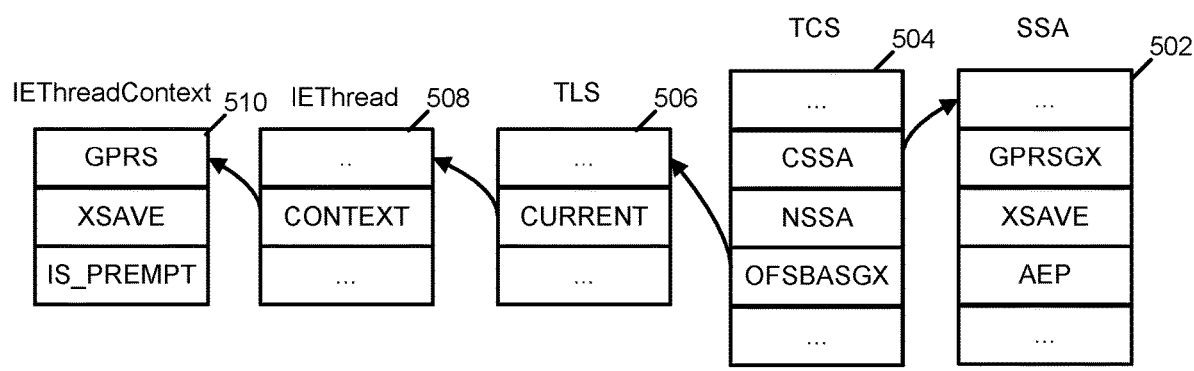
FIG. 5 is a block diagram illustrating enclave data structures allocated within preemptive scheduling enclaves in accordance with an embodiment of the present disclosure.

In act 404, the enclave thread initializes the preemptive scheduling enclave. Actions that may be executed within the act 404 include initializing default enclave data structures within the preemptive scheduling enclave and creating default IE threads (e.g., a "main" thread). As shown in FIG. 5, these enclave data structures include an SSA 502, a TCS 504, a TLS 506, an IEThread data structure 508, and an IEThreadContext data structure 510.

As illustrated in FIG. 5, the TCS 504 includes several fields allocated to store information used to control execution of an enclave thread and one or more IE threads executed by the enclave thread. These fields include a current state save area (CSSA) field, a number of state save areas (NSSA) field, and a OFSBASGX field. The CSSA field stores an identifier of the current SSA, which is associated with the currently executing (current) IE thread. The enclave thread increments the value of the CSSA field by 1 for each entry into the preemptive security enclave that specifies the TCS 504, and decrements the value of the CSSA field by 1 for each resume that specifies the TCS 504. For this reason, IE threads can determine whether or not they are nested by interrogating the value of the CSSA field. The NSSA field stores a value of a number of SSAs available and associated with the enclave thread. The OFSBASGX field stores an offset value that can be used to calculate the base address of a TLS associated with the CSSA.

In some embodiments, the SSA 502 includes several fields allocated to store information descriptive of a state of a logical processor at a particular point in time (e.g., when a hardware interrupt occurs). As shown, the SSA 502 is associated with the CSSA of the TCS 504. The fields of the SSA 502 include a GPRSGX field, a XSAVE field, and an asynchronous exit handler pointer (AEP) field. The GPRSGX field stores, among other information, values of the general-purpose and special-purpose registers of the logical processor. The XSAVE field stores, among other information, values of feature-specific registers of the logical processor. The AEP field stores an identifier of (e.g., a pointer to) an address outside the preemptive scheduling enclave that stores code to be executed after the logical processor completes handling of a hardware interrupt or other enclave exiting event.

In some embodiments, the TLS 506 includes several fields allocated to store thread local information associated with the current enclave thread (or TCS 504). As shown, the TLS 506 includes a CURRENT field that stores an identifier of (e.g. a pointer to) the IEThread 508.

In some embodiments, the IEThread data structure 508 includes several fields allocated to store information representing the IE thread executed by an enclave thread associated with the TCS 504. These fields include a CONTEXT field. The CONTEXT field stores an identifier of the IEThreadContext data structure associated with the IE thread represented by the IEThread data structure 508.

In some embodiments, the IEThreadContext data structure 510 includes several fields allocated to store information descriptive of the execution context of an IE thread. These fields include a GPRS field, an XSAVE field, and an IS_PREMPT field. The GPRS field stores, among other information, values of the general-purpose registers and special-purpose registers of the logical processor. The XSAVE field stores, among other information, values of feature-specific registers of the logical processor. The IS_PREMPT field stores an indicator (e.g., a Boolean value) of whether the execution context stored in the IEThreadContext data structure 510 was saved by preemptive scheduling.

Returning to FIG. 4, in act 406 the logical processor, via the enclave thread, executes a current IE thread. In act 408, the logical processor determines whether a hardware interrupt, or other enclave exit event, has occurred. If so, the logical processor executes act 410. Otherwise, the logical processor executes act 412.

In the act 410, the logical processor, via the enclave thread, saves its state within the current SSA. In act 420, the logical processor, via the enclave thread, exits the preemptive scheduling enclave. After the operating system handles the hardware interrupt, the logical processor, via a preemption manager (e.g., the preemption manager 300), determines whether preemption of the interrupted IE thread is warranted in act 422. In at least one embodiment, the logical processor identifies, prior to exiting the preemptive scheduling enclave, the address of the preemption manager with reference to the AEP field stored in the current SSA. If preemption is warranted, the preemption manager executes act 424. Otherwise, the preemption manager executes act 426.

In some embodiments, within act 422 the preemption manager determines that preemption is warranted where an amount of processor time allocated to the interrupted IE thread is exhausted. In act 424, the preemption manager re-enters the enclave and initiates rescheduling of IE threads as described further below with reference to FIG. 6. In act 426, the preemption manager resumes processing of interrupted IE thread.

In the act 412 the logical processor, via the current IE thread, executes a cooperative rescheduling function. The particular cooperative rescheduling function executed may vary between embodiments. In one embodiment, an in-enclave threading library provides a pthread-compatible function pthread_yield. In another embodiment, a library operating system for enclaves offers system calls like sched_yield or futex.

Figure 6:
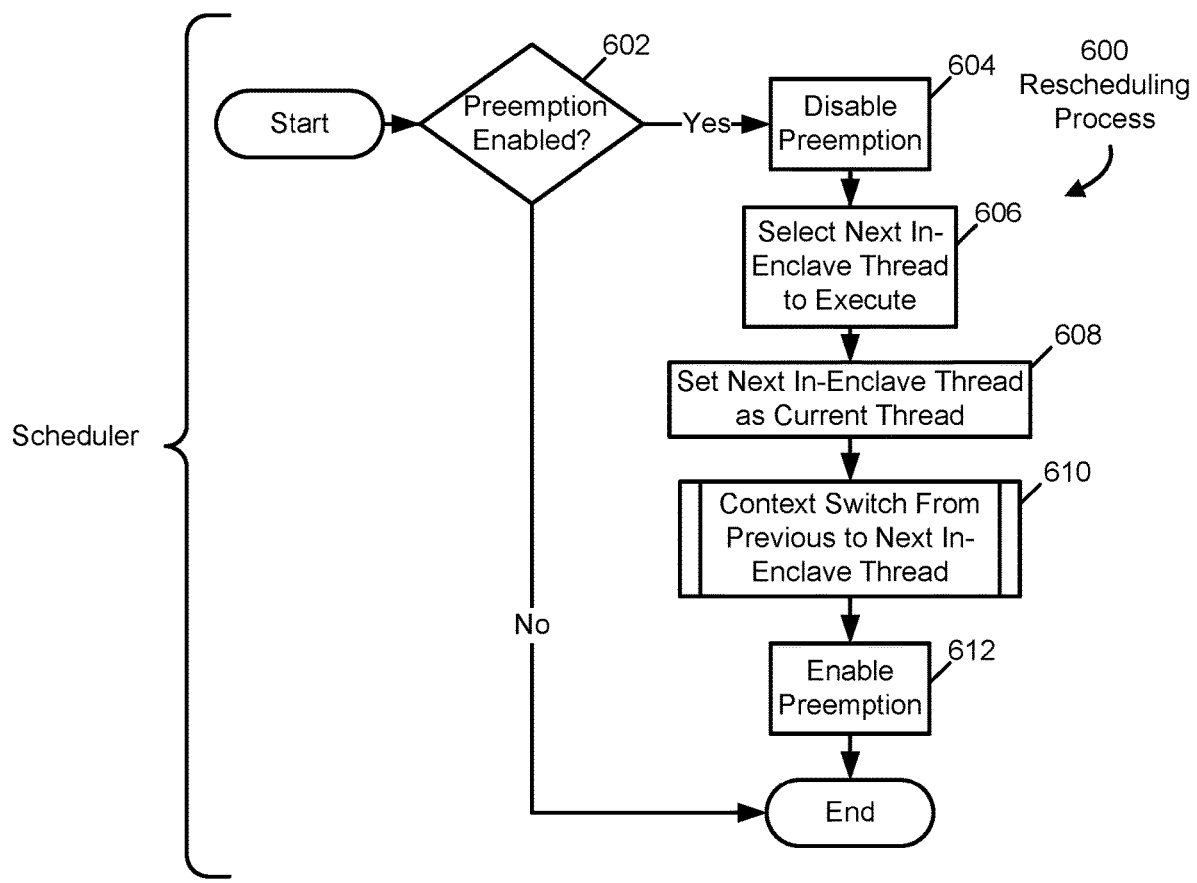
FIG. 6 is a flow chart illustrating a rescheduling process in accordance with an embodiment of the present disclosure.

In act 414, the logical processor, via a scheduler (e.g., any of the schedulers 206A through 206N), reschedules IE threads. FIG. 6 illustrates one example of a rescheduling process 600 that the scheduler is configured to execute according to some embodiments. The actions executed within the rescheduling process 600 collectively select an IE thread for execution and configure enclave data structures to schedule execution of the selected IE thread.

The rescheduling process 600 starts in act 602 with the scheduler determining whether preemption is currently enabled. In some embodiments, the scheduler determines whether preemption is enabled by evaluating a value (e.g., a Boolean flag) stored in memory of the preemptive scheduling enclave. Where the value indicates that preemption is enabled, the scheduler executes act 604. Where the value indicates that preemption is disabled, the scheduler terminates the rescheduling process 600.

In the act 604, the scheduler disables preemption to ensure that the rescheduling process 600 will be completed prior to another IE thread being executed. This approach prevents the logical processor from encountering race conditions or other undesirable situations. In at least one embodiment, the scheduler disables preemption by setting the value evaluated in act 602 to indicate that preemption is disabled.

Figure 7:
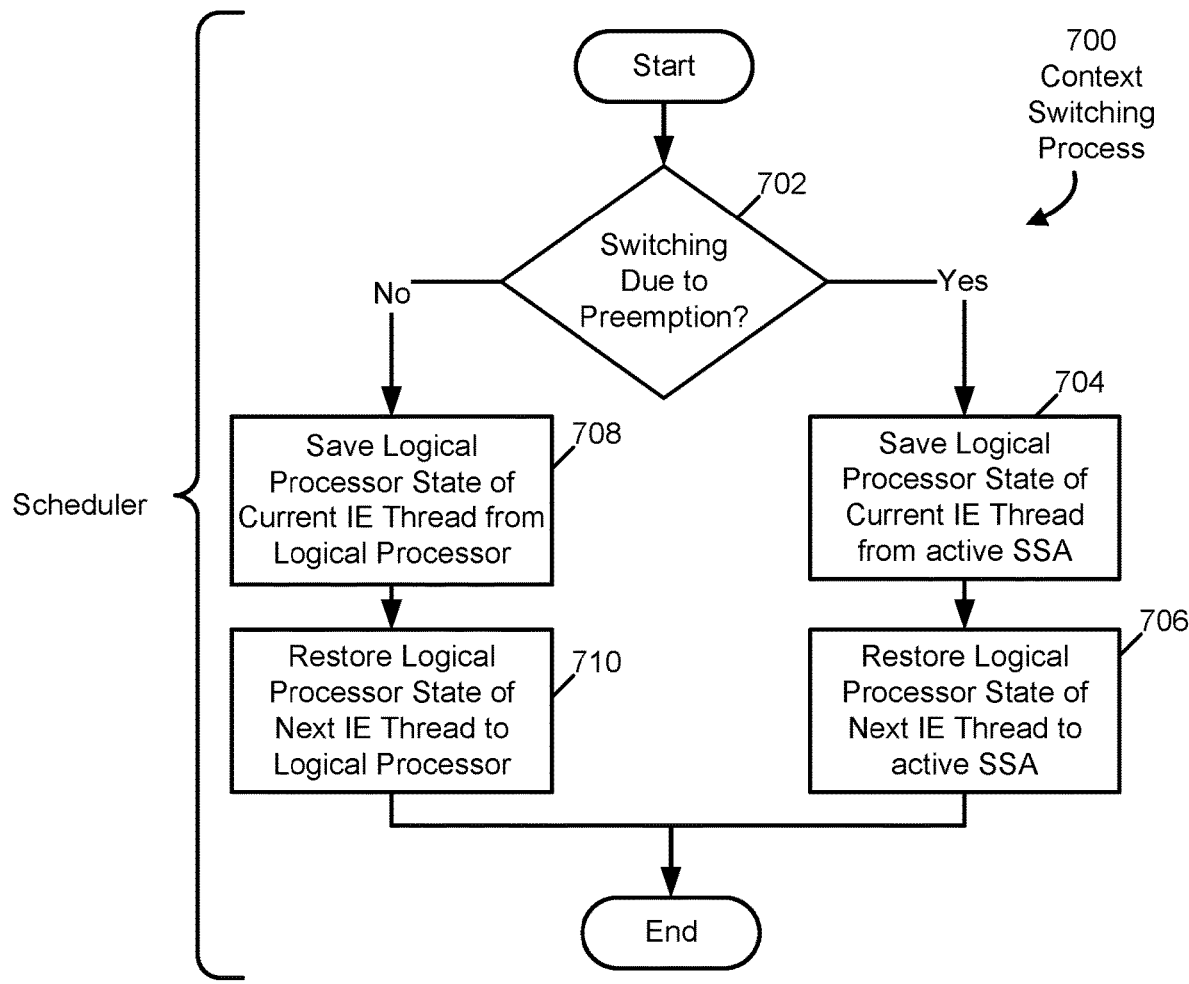
FIG. 7 is a flow chart illustrating a context switching process in accordance with an embodiment of the present disclosure.

In act 606, the scheduler selects a next IE thread to execute using any of a variety of scheduling processes (e.g., round-robin, multilevel queue, first come, first serve, etc.) known in the art. In act 608, the scheduler replaces the current IE thread with the next IE thread. In some embodiments, within the act 608, the scheduler accesses the CURRENT field of the TLS associated with the CSSA and replaces the indicator stored therein with an indicator of the IEThread structure of the next IE thread. In act 610, the scheduler executes a context switch from a logical processor state associated with the current IE thread to a logical processor state associated with the next IE thread. FIG. 7 illustrates one example of a context switching process 700 that the scheduler is configured to execute according to some embodiments. The actions executed within the context switching process 700 collectively save information required to reinstate execution of the current IE thread and store information required to instantiate execution of the next IE thread.

The context switching process 700 starts in act 702 with the scheduler determining whether the context switching process 700 is being executed due to preemption (e.g., by checking the value of the CSSA field of the TCS). If so (e.g., the value of the CSSA field=1), the scheduler executes act 704. Otherwise (e.g., the value of the CSSA field=0), the scheduler executes act 708.

In the act 704, the scheduler retrieves the execution context of the current IE thread from the current SSA and saves this execution context within an IEThreadContext structure (e.g., the IEThreadContext 510) associated with the current thread. As part of saving the execution context within the IEThreadContext structure, the scheduler stores a value of true in the IS_PREMPT Boolean variable. In act 706, the scheduler retrieves the execution context of the next IE thread from the IEThreadContext structure associated with the next IE thread and saves this execution context in the current SSA. In this way, the scheduler configures the current SSA with the execution context required for the logical processor to execute the next IE thread when the logical processor resumes IE thread execution.

In the act 708, the scheduler retrieves the execution context of the current IE thread from the logical processor and saves this execution context within an IEThreadContext structure associated with the current thread. In act 710, the scheduler retrieves the execution context of the next IE thread from an IEThreadContext structure associated with the next IE thread and restores this execution context to the logical processor. In this way, the scheduler configures the logical processor to execute the next IE thread when the logical processor returns to the act 406.

In some embodiments, the specific register values that are saved and restored by the scheduler within the acts 704 and 706 are different from those saved and restored within the acts 708 and 710 (i.e., these values vary between preemption or cooperation). For example, in these embodiments, where the context switching process 700 is being executed due to preemption, more register values must be stored within and restored from the IEThreadContext structure than when the switching process 700 is being executed due to cooperation.

For example, on an x86-64 machine running Linux, the callee-preserving registers are RBP, RBX, and R12-R15. Thus, in embodiments executing on this platform, the scheduler saves only the RBP, RBX, R12-R15, RSP, and RIP register values to the IEThreadContext structure for cooperative scheduling context switches. Thus, saving the context for cooperative scheduling (and later restoring the context) is much faster than doing so for a preemptive scheduling in these embodiments.

Returning to FIG. 6, in act 612 the scheduler enables preemption by, for example, setting the value evaluated in act 602 to indicate that preemption is enabled and the rescheduling process 600 ends.

Returning to FIG. 4, in act 416, the scheduler determines whether its execution was due to preemptive scheduling (e.g., initiated by the preemption manager). If not, the scheduler executes the act 406. Otherwise, the scheduler executes act 418. In the act 418, the scheduler exits the enclave. After exiting the nested entry and resuming the enclave in the act 426, the enclave thread resumes execution of the IE thread identified in the enclave data structures and associated with the logical processor state saved in the current SSA (in the act 406). Because this logical processor state is associated with the next IE thread, the preemptive scheduling process 400 successfully implements preemptive scheduling within the preemptive scheduling enclave.

Further Example Embodiments

The following examples pertain to further embodiments, from which numerous permutations and configurations will be apparent.

Example 1 is a computing device comprising a memory and at least one logical processor coupled to the memory. The memory comprises an enclave and a preemption manager distinct from the enclave. The at least one logical processor is configured to execute an in-enclave thread; receive a hardware interrupt while executing the in-enclave thread; exit the enclave in response to receiving the hardware interrupt; handle the hardware interrupt; and execute the preemption manager after handling the hardware interrupt.

Example 2 includes the subject matter of Example 1, wherein the preemption manager is configured to determine whether the in-enclave thread should be preempted.

Example 3 includes the subject matter of Example 2, wherein the preemption manager is configured to determine whether the in-enclave thread should be preempted at least in part by determining whether logical processor time allocated to the in-enclave thread has been exhausted.

Example 4 includes the subject matter of Example 2 or Example 3, wherein the preemption manager is configured to resume execution of the in-enclave thread in response to determining that the in-enclave thread should not be preempted.

Example 5 includes the subject matter of any of Examples 2-4, wherein the enclave further comprises a scheduler and the preemption manager is configured to re-enter the enclave and initiate the scheduler in response to determining that the in-enclave thread should be preempted.

Example 6 includes the subject matter of Example 5, wherein the scheduler is configured to: identify a next in-enclave thread to execute; replace the in-enclave thread with the next in-enclave thread; and execute a context switch from the in-enclave thread to the next in-enclave thread.

Example 7 includes the subject matter of Example 5 or Example 6, wherein the scheduler is configured to execute a context switch at least in part by saving, from a current state save area, a first state of the at least one logical processor associated with the in-enclave thread and restoring, to the current state save area, a second state of the at least one logical processor associated with the next in-enclave thread.

Example 8 includes the subject matter of any of Examples 5-7, wherein the scheduler is further configured to determine whether the scheduler was initiated by the preemption manager.

Example 9 includes the subject matter of any of Examples 5-8, wherein the scheduler is further configured to exit the enclave in response to determining that the scheduler was initiated by the preemption manager.

Example 10 includes the subject matter of Example 9, wherein the at least one logical processor is configured to resume execution of the next in-enclave thread in response to the scheduler exiting the enclave.

Example 11 is a method of implementing preemptive scheduling of in-enclave threads. The method comprises executing an in-enclave thread; receiving hardware interrupt while executing the in-enclave thread; exiting an enclave in response to receiving the hardware interrupt; handling the hardware interrupt; and executing a preemption manager stored outside the enclave after handling the hardware interrupt.

Example 12 includes the subject matter of Example 11, further comprising determining whether the in-enclave thread should be preempted.

Example 13 includes the subject matter of Example 12, wherein determining whether the in-enclave thread should be preempted comprises determining whether logical processor time allocated to the in-enclave thread has been exhausted.

Example 14 includes the subject matter of Example 12 or Example 13, further comprising resuming execution of the in-enclave thread in response to determining that the in-enclave thread should not be preempted.

Example 15 includes the subject matter of any of Examples 12-14, further comprising: re-entering, in response to determining that the in-enclave thread should be preempted, the enclave; and executing a scheduler.

Example 16 includes the subject matter of Example 15, further comprising: identifying, via the scheduler, a next in-enclave thread to execute; replacing the in-enclave thread with the next in-enclave thread; and executing a context switch from the in-enclave thread to the next in-enclave thread.

Example 17 includes the subject matter of Example 15 or Example 16, wherein executing the context switch comprises: saving, from a current state save area, a first state of at least one logical processor associated with the in-enclave thread; and restoring, to the current state save area, a second state of the at least one logical processor associated with the next in-enclave thread.

Example 18 includes the subject matter of any of Examples 15-17, further comprising: determining that the scheduler was initiated by the preemption manager; and exiting the enclave in response to determining that the scheduler was initiated by the preemption manager.

Example 19 includes the subject matter of Example 18, further comprising resuming execution of the next in-enclave thread in response to the scheduler exiting the enclave.

Example 20 is a non-transient computer readable medium encoded with instructions that when executed by one or more processors cause a process for implementing preemptive scheduling of in-enclave threads to be carried out. The process comprises executing an in-enclave thread; receiving hardware interrupt while executing the in-enclave thread; exiting an enclave in response to receiving the hardware interrupt; handling the hardware interrupt; and executing a preemption manager stored outside the enclave after handling the hardware interrupt.

Example 21 includes the subject matter of Example 20, wherein the process further comprises determining whether the in-enclave thread should be preempted.

Example 22 includes the subject matter of Example 21, wherein determining whether the in-enclave thread should be preempted comprises determining whether logical processor time allocated to the in-enclave thread has been exhausted.

Example 23 includes the subject matter of Example 21 or Example 22, wherein the process further comprises resuming execution of the in-enclave thread in response to determining that the in-enclave thread should not be preempted.

Example 24 includes the subject matter of any of Examples 21-23, wherein the process further comprises: re-entering, in response to determining that the in-enclave thread should be preempted, the enclave; and executing a scheduler.

Example 25 includes the subject matter of Example 24, wherein the process further comprises: identifying, via the scheduler, a next in-enclave thread to execute; replacing the in-enclave thread with the next in-enclave thread; and executing a context switch from the in-enclave thread to the next in-enclave thread.

Example 26 includes the subject matter of Example 24 or Example 25, wherein executing the context switch comprises: saving, from a current state save area, a first state of at least one logical processor associated with the in-enclave thread; and restoring, to the current state save area, a second state of the at least one logical processor associated with the next in-enclave thread.

Example 27 includes the subject matter of any of Examples 24-26, wherein the process further comprises: determining that the scheduler was initiated by the preemption manager; and exiting the enclave in response to determining that the scheduler was initiated by the preemption manager.

Example 28 includes the subject matter of Example 27, wherein the process further comprises resuming execution of the next in-enclave thread in response to the scheduler exiting the enclave.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
a memory comprising an enclave and a preemption manager distinct from the enclave; and
at least one logical processor coupled to the memory and configured to
execute an in-enclave thread,
receive a hardware interrupt while executing the in-enclave thread,
exit the enclave in response to receiving the hardware interrupt,
handle the hardware interrupt,
execute the preemption manager after handling the hardware interrupt, wherein the preemption manager is configured to determine whether the in-enclave thread should be preempted, in response to a determination by the preemption manager that the in-enclave thread should not be preempted, resume execution of the in-enclave thread, and in response to a determination by the preemption manager that the in-enclave thread should be preempted, execute a scheduler.

2. The computing device of claim 1, wherein the preemption manager is configured to determine whether the in-enclave thread should be preempted at least in part by determining whether logical processing time allocated to the in-enclave thread has been exhausted.

3. The computing device of claim 1, wherein the enclave further comprises the scheduler and the preemption manager is configured to re-enter the enclave and execute the scheduler in response to determining that the in-enclave thread should be preempted, wherein the scheduler is configured to identify a next in-enclave thread to execute;

replace the in-enclave thread with the next in-enclave thread; and execute a context switch from the in-enclave thread to the next in-enclave thread.

4. The computing device of claim 3, wherein the scheduler is configured to:

execute a context switch at least in part by saving, from a current state save area, a first state of the at least one logical processor associated with the in-enclave thread and restoring, to the current state save area, a second state of the at least one logical processor associated with the next in-enclave thread;

determine whether the scheduler was initiated by the preemption manager; and exit the enclave in response to determining that the scheduler was initiated by the preemption manager;

wherein the at least one logical processor is configured to resume execution of the next in-enclave thread in response to the scheduler exiting the enclave.

5. A method of implementing preemptive scheduling of in-enclave threads, the method comprising:

executing an in-enclave thread;

receiving a hardware interrupt while executing the in-enclave thread;

exiting an enclave in response to receiving the hardware interrupt;

handling the hardware interrupt;

executing a preemption manager stored outside the enclave after handling the hardware interrupt;

determining, using the preemption manager, whether the in-enclave thread should be preempted;

in response to determining that the in-enclave thread should not be preempted, resuming execution of the in-enclave thread; and in response to determining that the in-enclave thread should be preempted, executing a scheduler.

6. The method of claim 5, further comprising:

re-entering, in response to determining that the in-enclave thread should be preempted, the enclave.

7. The method of claim 6, further comprising:

identifying, via the scheduler, a next in-enclave thread to execute;

replacing the in-enclave thread with the next in-enclave thread; and executing a context switch from the in-enclave thread to the next in-enclave thread.

8. The method of claim 7, wherein executing the context switch comprises:

saving, from a current state save area, a first state of at least one logical processor associated with the in-enclave thread; and restoring, to the current state save area, a second state of the at least one logical processor associated with the next in-enclave thread.

9. The method of claim 8, further comprising:

determining that the scheduler was initiated by the preemption manager; and exiting the enclave in response to determining that the scheduler was initiated by the preemption manager.

10. The method of claim 9, further comprising resuming execution of the next in-enclave thread in response to the scheduler exiting the enclave.

11. A computer program product including one or more non-transitory machine-readable medium encoded with instructions that when executed by one or more processors cause a process to be carried out for implementing preemptive scheduling of in-enclave threads, the process comprising:

executing an in-enclave thread;

receiving a hardware interrupt while executing the in-enclave thread;

exiting an enclave in response to receiving the hardware interrupt;

handling the hardware interrupt;

executing a preemption manager stored outside the enclave after handling the hardware interrupt;

determining, using the preemption manager, whether the in-enclave thread should be preempted;

in response to determining that the in-enclave thread should not be preempted, resuming execution of the in-enclave thread; and in response to determining that the in-enclave thread should be preempted, executing a scheduler.

12. The computer program product of claim 11, wherein the process further comprises:

re-entering, in response to determining that the in-enclave thread should be preempted, the enclave.

13. The computer program product of claim 12, wherein the process further comprises:

identifying, via the scheduler, a next in-enclave thread to execute;

replacing the in-enclave thread with the next in-enclave thread; and executing a context switch from the in-enclave thread to the next in-enclave thread.

14. The computer program product of claim 13, wherein executing the context switch comprises:

saving, from a current state save area, a first state of at least one logical processor associated with the in-enclave thread; and restoring, to the current state save area, a second state of the at least one logical processor associated with the next in-enclave thread.

15. The computer program product of claim 14, wherein the process further comprises:

determining that the scheduler was initiated by the preemption manager; and exiting the enclave in response to determining that the scheduler was initiated by the preemption manager.

16. The computer program product of claim 15, wherein the process further comprises resuming execution of the next in-enclave thread in response to the scheduler exiting the enclave.

17. The method of claim 5, wherein determining, using the preemption manager, whether the in-enclave thread should be preempted comprises at least in part determining whether logical processing time allocated to the in-enclave thread has been exhausted.

18. The computer program product of claim 11, wherein determining, using the preemption manager, whether the in-enclave thread should be preempted comprises at least in part determining whether logical processing time allocated to the in-enclave thread has been exhausted.

19. The method of claim 7, wherein identifying, via the scheduler, a next in-enclave thread to execute comprises using at least one of a round-robin, multilevel queue, or first-come first-serve scheduling process.

20. The computer program product of claim 13, wherein identifying, via the scheduler, a next in-enclave thread to execute comprises using at least one of a round-robin, multilevel queue, or first-come first-serve scheduling process.

* * * * *